Figure 1:
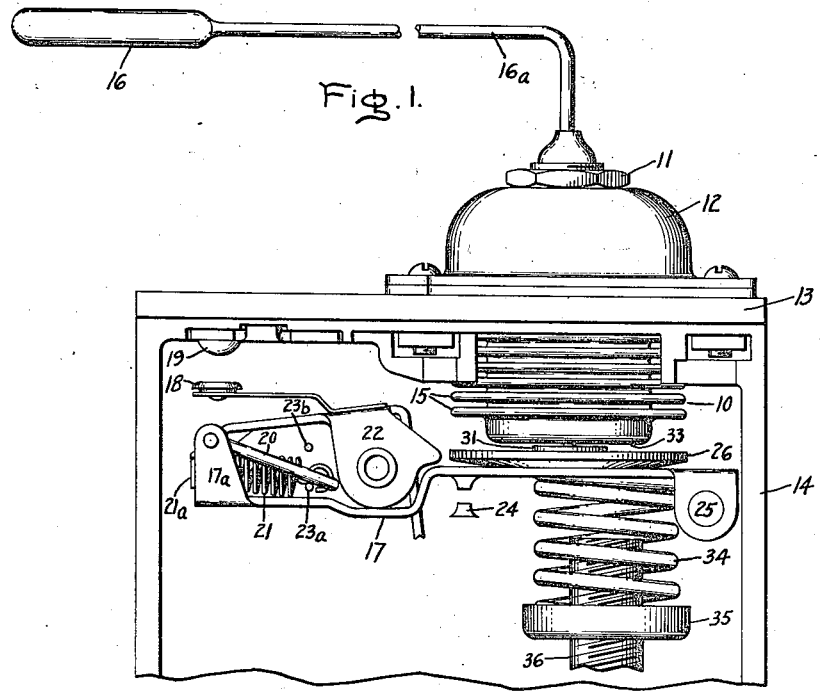

Aug. 11, 1936.   J. B. FORD   2,050,883

TEMPERATURE CONTROL DEVICE

Filed Feb. 1, 1935

Inventor:
John B. Ford,
by Harry E. Dunham
His Attorney.

Patented Aug. 11, 1936

2,050,883

UNITED STATES PATENT OFFICE 2,050,883

TEMPERATURE CONTROL DEVICE

John B. Ford, Schenectady, N. Y., assignor to General Electric Company, a corporation of New York Application February 1, 1935, Serial No. 4,482

7 Claims. (Cl. 297—8)

My invention relates to temperature control devices, more particularly to temperature control devices utilizing expansible bellows, and has for an object the provision of a rugged, simple and inexpensive means for effectively preventing abnormal deformation of the bellows.

My invention is particularly applicable to expansible bellows of the type used in the operation of refrigerator control switches. As used with switches of this type the bellows is formed from a thin metallic tube, a plurality of corrugations being formed in the tube to permit longitudinal expansion and contraction of the bellows in response to predetermined changes in gas pressure, the bellows being ordinarily connected by a tube to a bulb to form a closed system containing a suitable vaporizable fluid. Ordinarily, under the low temperature conditions prevailing in a refrigerator the gas pressure in the system is quite low, of the order of 20 to 40 pounds per square inch, and there is therefore little tendency for the bellows to move laterally and so deform the corrugations an amount sufficient to cause them to take a permanent set.

Even though the bellows is not permanently deformed at ordinary room temperatures of 74° F., the pressure developed by the vaporizable fluid is sufficiently great to cause the bellows to expand unevenly. Certain of its corrugations will then be crowded together while other corrugations will be separated a substantial distance. In this condition the bellows presents an unsightly appearance which tends to raise doubts as to the accuracy of its operation. The difficulty in selling the control device itself is correspondingly increased.

With pressures approaching sixty pounds per square inch, such as are developed when the device is subjected to relatively high atmospheric air temperatures, the deformation of the bellows stretches the corrugations beyond the yielding point of the metal. The result is that the bellows takes a permanent set with consequent changes in its temperature-responsive operating characteristics. Thus, it has been found that refrigerators shipped into or through hot climatic regions often have their temperature-responsive control devices damaged to such an extent as to greatly change their original temperature setting. For example, control devices which have been subjected to temperatures of approximately 90° F. or above have been found to have their temperature adjustment changed by as much as 10° F. or more, the device then operating to maintain a refrigerator temperature of approximately 32° F. instead of the desired temperature of 42° F. maintained by it when built.

In maintaining this average forty-two degree temperature the control device operates between two predetermined evaporator temperatures, for example, 16° F. and 26° F., the difference of ten degrees being known as the temperature differential. This temperature differential may be greater or less depending on the operating characteristics of the particular make of refrigerator upon which the device is used. For any given machine the temperature differential remains at a constant value determined by a factory adjustment. By providing a temperature control means actuated by a knob the average refrigerator temperature can be adjusted within a predetermined temperature range. However, the temperature differential remains the same, since the adjustment changes both the upper and lower values by the same amount and in the same direction. After the bellows has been deformed beyond its yield point, the temperature differential changes materially. With a factory setting for a ten degree differential, the permanent set taken by the bellows decreases this differential to approximately five degrees or less. I have found that it is not economic to attempt to readjust the control device for its intended operation with a 10° F. differential because of additional adjustments required to maintain the factory settings for the defrosting and quick freezing features frequently incorporated in the control device. It has, therefore, been necessary to replace the bellows, in itself an expensive procedure because of the skilled labor required, or to supply a new control device. In either case the customer was put to great inconvenience.

Furthermore, bellows which have been subjected to temperatures of approximately 120° F. not only have been twisted and deformed beyond any hope of further use but the light metallic switch parts associated with it also have been bent out of shape by the undue expansion of the bellows.

In carrying out my invention in one form thereof I provide a shoulder or ledge arranged adjacent the operating face of the bellows, the ledge being dimensioned to prevent effectively more than a predetermined lateral deformation of the bellows. In order to improve the accuracy of control I provide a pointed projection on the ledge arranged to cooperate with a recess or indentation formed in the end of the bellows so that during normal operation the bellows makes point contact with a switch operating arm. The movement of the switch arm and hence the longitudinal expansion of the bellows is limited by the provision of suitable stopping means.

Figure 2:
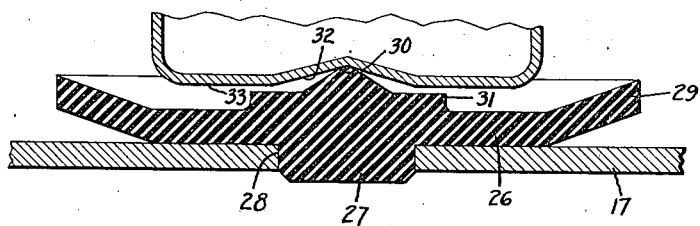

For a more complete understanding of my invention reference should now be had to the drawing wherein I have shown in Fig. 1 an embodiment of my invention as applied to a refrigerator control switch; Fig. 2 is an enlarged sectional elevation of my attachment, a portion of the bellows and a portion of the refrigerator control switch shown in Fig. 1.

Referring to the drawing, I have shown my invention in one form as applied to an expansible bellows 10 secured at one end by a locknut 11 to a metal cap 12 supported on an end wall 13 of a refrigerator control switch housing 14. The bellows, formed from a thin walled tube, is provided with a plurality of corrugations 15 to give it resiliency and to permit longitudinal expansion and contraction of the bellows in response to variations in pressure. As applied to a refrigerator, a bulb 16 filled with a suitable vaporizable fluid, for example, methyl chloride, and secured to the evaporator (not shown) is connected by a conduit 16a to the bellows. The methyl chloride fluid produces a vapor pressure proportional to the temperature of the evaporator within the permanently closed system formed by the bulb, the conduit and the bellows. As shown in Fig. 1, the bellows 10 has moved a switch operating member 17 to an off position to separate a movable contact 18 from a stationary contact 19.

Although my invention is applicable to any suitable switch mechanism I prefer to use an over-center spring arrangement of the type disclosed and claimed by Letters Patent No. 1,921,126 to Hutt, dated August 8, 1933, and entitled "Combined automatic and manual circuit controller". In the present case the mechanism will be briefly described by saying that it consists of a U-shaped link 20 pivoted at its ends to the end 17a of the switch member 17. An over-center spring 21, connected at one end to the closed end of the link 20 and at its other end to an extension 21a of a pivoted contact supporting member 22 serves to operate the contact 18 between open and closed circuit positions with a snap action. Suitable stops 23a and 23b are provided to limit the movement of the link 20 while a stop 24 limits the movement of the switch member 17 around its pivot 25. Preferably, the stop 24, located fairly close to the center bellows and in a transverse plane taken through the center of the bellows, is arranged to resist directly the load imposed on the member 17 by an excessive bellows pressure.

Continuing with the description of my invention, a member or bellows attachment 26 formed of a suitable insulating material, such as a phenolic condensation product, is provided with a relatively large mounting projection 27 which is pressed into an aperture 28 provided in the switch member 17. The annular surface of this projection is knurled to insure a rigid connection with the member 17, the knurled ridges (not shown) being slightly larger than the aperture 28. By providing a wide skirt or flange 29 on the member 26 the desired electrical creepage is obtained and the electrical isolation of the bellows from the remainder of the switch mechanism is insured.

The member 26 is also provided with a pointed conical projection 30 formed at the center of an annular shoulder or ledge 31, the projection normally engaging a conical recess or indentation 32 formed at the center of the operating face 33 of the bellows 10. The angle at the apex is preferably of the order of 120 degrees while the angle of the recess is somewhat larger, preferably of the order of 150 degrees, to provide mechanical clearance between the surfaces and to insure that the bellows during normal operation makes point contact with the apex of the projection. As shown in Fig. 2, the length of the projection is but slightly greater than the depth of the recess. Preferably, the difference between the two is such that the shoulder 31 is spaced about five thousandths of an inch from the operating face 33 of the bellows. Consequently, if the bellows pressure rises to an abnormally high value, of the order of sixty pounds per square inch with an ambient temperature of 85 degrees, any rotary or lateral movement of the bellows will be prevented by the engagement of the face 33 with the ledge or shoulder 31. Although the proportions of the ledge can be varied somewhat, I prefer to design it with a diameter approximately half that of the operating face of the bellows. With this dimensioning the deformation and the resultant set taken by the bellows is effectively prevented. If the ledge is substantially larger, for example, equal to the diameter of the operating face 33, the spacing between the two would be increased somewhat to insure the necessary clearance during normal operation of the refrigerator.

Referring to Fig. 1, as the temperature of the bulb 16 rises, for example, from 16° F. to 26° F., the bellows 10 expands and exerts a force on the switch member 17 sufficient to move it against the opposing bias of a temperature control spring 34 supported between the member 17 and a threaded spring seat 35. The normal movement of the bellows is very small, of the order of 1/32 of an inch, but it is sufficiently great to cause the member 17 to carry the over-center spring 21 past a dead-center position. The spring 21 thereupon operates the movable contact into engagement with the stationary contact 19. The refrigerating apparatus then functions to cool the refrigerator, the bellows pressure decreasing with the fall in the refrigerator temperature. When the bulb temperature is returned to its predetermined value, for example, 13° F., the spring 34 moves the lever 17 to open the switch. In each case the bellows makes point contact with the switch member 17. Consequently, the lever arm, i. e., the distance from the pivot 25 to the point of contact of the member 17 with the bellows, remains fixed. Furthermore, the bellows and control switch can be adjusted at the factory and shipped through warm climates without changing the factory adjustments which would otherwise result from a deformation of the bellows. By mounting the threaded spring seat 35 on an adjusting screw 36 the temperature setting of the control device can be varied somewhat. Normally the screw is rotatable through an angle of approximately 270°.

When the air temperature surrounding the bulb 16 is 120° F. or more, the bellows pressure rises to 100 pounds or more per square inch. Only a small fraction of this pressure is applied to the switch mechanism by reason of the stop 24 which limits the movement of the member 17 and the compression of the spring 34. The stop 24 by engaging the member 17 sufficiently close to its pivot 25 and midway between its pivotal bearings reinforces the member 17 so that it cannot be bent by the high pressures. This feature is of advantage because the member 17 is ordinarily constructed of relatively light gauge steel.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:—

1. In combination, an expansible bellows provided with an operating face, a member operable thereby between predetermined positions, means providing a point contact between said face and said member comprising a projection and a recess, said member being provided with a flat surface normally spaced from said face for preventing deformation of said bellows, and stop means for limiting the movement of said member by said bellows.

2. In combination, an expansible bellows provided with a recess in an operating face thereof, a member provided with a conical projection for engaging said recess, said member having a ledge normally spaced a slight distance from said face by the relative length and depth of said projection and said recess, and means rigidly supporting said member so that when said face engages said ledge further movement of said face is prevented to minimize deformation of said bellows.

3. An attachment for expansible bellows comprising a member having a pointed projection formed integrally therewith for making point contact with said bellows, and a ledge formed integrally with said member and normally spaced a slight distance from the face of said bellows for engaging said bellows at a point sufficiently removed from said projection to prevent permanent distortion of said bellows when subjected to high pressure.

4. An attachment for expansible bellows of the type subject to deformation by the occurrence of undue high pressures comprising a member formed of insulating material of substantially the same diameter as said bellows, said member being provided with a ledge substantially half the diameter of one face of said bellows, said ledge having a pointed projection at its center to engage the center of said bellows, said ledge being spaced but a slight distance from said bellows to minimize deformation of said bellows by the engagement of said ledge with said face of said bellows.

5. In combination, an expansible bellows capable of being deformed on the occurrence of a predetermined high pressure, a movable member operable from one position to another by said bellows, and an intermediate member formed of insulating material disposed between said movable member and an operating face of said bellows, said intermediate member being provided with a ledge substantially half the diameter of said face and having a pointed projection at its mid-portion for providing point contact with said face, said projection normally spacing said ledge a slight distance from said face whereby said face of said bellows engages the outer edge of said ledge upon the occurrence of said predetermined high pressure to minimize deformation of said bellows.

6. In combination, an expansible bellows, a movable member operable by the expansion and contraction of said bellows and provided with an aperture, a member interposed between the operating face of said bellows and said movable member, said interposed member being provided with a relatively large projection arranged to tightly fit said aperture, said interposed member being formed with a ledge substantially half the diameter of said face, and a pointed projection integrally formed with said ledge to provide point contact with said operating face and to space said ledge a slight distance from said face whereby said face engages said ledge to permanent deformation of said bellows.

7. In combination, a corrugated expansible bellows provided with an operating face having an indentation provided at its mid-point, a pivoted member mounted adjacent said operating face, an intermediate member supported by said pivoted member, said intermediate member having formed integrally therewith a ledge substantially half the diameter of said operating face, said ledge having integrally secured at its center a conical projection for engaging said indentation to provide point contact between said bellows and said intermediate member whereby upon normal expansion and contraction of said bellows the movement of said bellows is transmitted to said pivoted member solely through said point contact, fluid means for producing a pressure within said bellows proportional to the ambient temperature of said fluid means, said ledge and said face being operable into engagement by lateral movement of said bellows in response to a predetermined high bellows pressure to prevent said corrugated bellows from taking a permanent set, and stop means engaging said pivoted member at a point located fairly close to said projection and in a transverse plane taken through the center of said bellows for preventing damage to said pivoted member by said high pressures.

JOHN B. FORD.